United States Patent
Seo (10) Patent No.: US 10,019,148 B2
(45) Date of Patent: Jul. 10, 2018

(54) METHOD AND APPARATUS FOR CONTROLLING VIRTUAL SCREEN

(71) Applicant: Samsung Electronics Co. Ltd., Suwon-si, Gyeonggi-do (KR)

(72) Inventor: Jang-Seok Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 13/861,800

(22) Filed: Apr. 12, 2013

(65) Prior Publication Data

US 2014/0118273 A1 May 1, 2014

(30) Foreign Application Priority Data

Nov. 1, 2012 (KR) .................. 10-2012-0123285

(51) Int. Cl.
*G06F 3/0488* (2013.01)
*G06F 3/0485* (2013.01)
*G06F 3/0354* (2013.01)

(52) U.S. Cl.
CPC ........ *G06F 3/0488* (2013.01); *G06F 3/03545* (2013.01); *G06F 3/0485* (2013.01); *G06F 2203/04104* (2013.01)

(58) Field of Classification Search
CPC ............ G06F 17/30056; G06F 17/243; G06F 3/048822; G06F 2203/04106; G06F 17/04
See application file for complete search history.

(56) References Cited

U.S. PATENT DOCUMENTS

| 8,675,019 B1 * | 3/2014 | Feinstein .............. G09G 5/026 345/589 |
| 2002/0067347 A1 | 6/2002 | Maezawa et al. |
| 2009/0265628 A1 * | 10/2009 | Bamford .............. G06F 3/0482 715/702 |
| 2010/0095205 A1 | 4/2010 | Kinoshita |

(Continued)

FOREIGN PATENT DOCUMENTS

| CN | 101523331 A | 9/2009 |
| CN | 102129340 A | 7/2011 |
| EP | 2 071 436 A1 | 6/2009 |

OTHER PUBLICATIONS

"Corel Painter 12 Getting Started Guide", May 14, 2011 (May 14, 2011), XP055107744, Retrieved from the Internet: URL:http://www.corel.com/content/pdf/p12/pai nterl2_getti ng_started gui deen.pdf.

*Primary Examiner* — Grant Sitta
*Assistant Examiner* — Amen Bogale
(74) *Attorney, Agent, or Firm* — Jefferson IP Law, LLP (57) ABSTRACT

A method and an apparatus for controlling a virtual screen in a touch screen device are provided. The method includes detecting a touch screen input on a screen view, the screen view displaying a partial area of the virtual screen on a display unit of the electronic device, determining whether the touch screen input is a stylus input or a touch input, the stylus input being executed by a user controlling a stylus and the touch input being executed by the user using a body part of the user, processing the stylus input as a manipulation input corresponding to the virtual screen when the touch screen input is the stylus input, and moving the screen view on the virtual screen in response to a touch movement of the touch input when the touch screen input is the touch input.

12 Claims, 7 Drawing Sheets

(56) References Cited

U.S. PATENT DOCUMENTS

| | | | |
|---|---|---|---|
| 2011/0083099 A1* | 4/2011 | Eun | G06F 3/0485 |
| | | | 715/786 |
| 2011/0161864 A1 | 6/2011 | Nagasaka et al. | |
| 2011/0175834 A1* | 7/2011 | Han | G06F 3/044 |
| | | | 345/173 |
| 2011/0191671 A1* | 8/2011 | Hammond | G06F 17/24 |
| | | | 715/269 |
| 2011/0296344 A1* | 12/2011 | Habib | G06F 1/1616 |
| | | | 715/810 |
| 2011/0304556 A1* | 12/2011 | Harris | G06F 3/04883 |
| | | | 345/173 |
| 2012/0062604 A1 | 3/2012 | Lobo et al. | |
| 2012/0306927 A1* | 12/2012 | Lee | G06F 3/041 |
| | | | 345/660 |
| 2012/0313876 A1* | 12/2012 | Smith | G06F 9/4443 |
| | | | 345/173 |
| 2013/0069860 A1* | 3/2013 | Davidson | G06F 3/0416 |
| | | | 345/156 |
| 2014/0092140 A1* | 4/2014 | Wadhwa | G09G 3/20 |
| | | | 345/660 |

\* cited by examiner

METHOD AND APPARATUS FOR CONTROLLING VIRTUAL SCREEN

PRIORITY

This application claims the benefit under 35 U.S.C. § 119(a) of Korean patent application Serial No. 10-2012-0123285, which was filed in the Korean Intellectual Property Office on Nov. 1, 2012, the entire contents of which is hereby incorporated by reference.

BACKGROUND OF THE INVENTION

1. Field of the Invention

The present invention relates to a method and an apparatus for controlling a virtual screen. More particularly, the present invention relates to a method and an apparatus for controlling a manipulation input related to a virtual screen and a movement of a screen view displaying a partial area of the virtual screen via the screen view.

2. Description of the Related Art

Applications and/or functions, such as word processing, drawing and memo, which may be used in a portable computing apparatus having a small display unit, may provide a virtual screen. The term "virtual screen" may refer to an area in which editing or viewing can be performed, wherein the virtual screen includes both an area displayed on a screen of a display unit and an area which is not displayed on the screen of the display unit.

A portable computing apparatus may use a touch screen display unit. The touch screen display unit may provide a User Interface (UI) or User Experience (UX) through a touch screen included in the touch screen display unit. The touch screen display unit may display graphics and text on the touch screen, and may detect and respond to a touch on the touch screen. An apparatus, such as the portable computing apparatus, which uses the touch screen display unit may display one or more soft keys, a menu and other UI and/or UX objects on the touch screen. A user may cause the apparatus to receive an input related to UI and/or UX object by performing an operation for a touch screen input at a position matched to a UI and/or UX object. The touch screen input may be a stylus input or a touch input. The term "stylus input" may refer to the touch of a stylus or similar and/or suitable object to the screen, and the term "touch input" may refer to the touch of a part of the human body, such as a finger, to the touch screen. Herein, the touch may include a direct touch to the touch screen, a proximity to the touch screen, and any other similar and/or suitable touch to the touch screen according to a scheme for a touch screen input.

In the portable computing apparatus which uses the touch screen display unit, functions and/or operations, such as editing, viewing, and the like, that are related to a virtual screen may be performed through a screen view displayed on the touch screen. The screen view displays a selected partial area of the virtual screen. The user may select a part of the virtual screen by using a touch screen input on the screen view, and may view or edit the selected part on the screen view. As described herein, the portable computing apparatus which uses the touch screen display unit may be referred to as a "touch screen device."

In the touch screen device, as a size of the touch screen becomes larger, a number of times of executing a stylus input for functions and/or operations may also increase. The stylus input may be used as a precise input. For example, a handwriting input may be executing via the stylus input in order to recognize a handwriting of the user, instead of a using a touch input of a finger for the handwriting. In a case of the UI and/or UX, the stylus input and the touch input have been treated as being identical to each other. When the stylus input is not separately distinguished from the touch input, but rather, it is determined that the stylus input and the touch input are both with an identical pointing input, then a UI and/or UX scenario may become complicated. Also, the screen view may be moved on the virtual screen according to the manipulation of a scroll bar. Therefore, there is a limit on a fast and natural movement of the screen view because of use of the scroll bar.

Therefore, a need exists for a system and method for controlling a manipulation input related to a virtual screen and a movement of a screen view displaying a partial area of the virtual screen via the screen view.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages below. Accordingly, an aspect of the present invention is to provide a method and an apparatus for controlling a virtual screen, which may implement a control of a manipulation input corresponding to the virtual screen through a screen view and the control of the movement of the screen view.

Another aspect of the present invention is to provide a method and an apparatus for controlling a virtual screen, which may improve a response speed of both a manipulation input corresponding to the virtual screen through a screen view and the movement of the screen view.

Another aspect of the present invention is to provide a method and an apparatus for controlling a virtual screen, which may first determine whether a touch screen input on a screen view is a stylus input or a touch input and may then process both a manipulation input related to the virtual screen on the screen view and the movement of the screen view in response to each of the stylus input and the touch input.

In accordance with an aspect of the present invention, a method for controlling a virtual screen is provided. The method includes detecting a touch screen input on a screen view, the screen view displaying a partial area of the virtual screen on a display unit of the electronic device, determining whether the touch screen input is a stylus input or a touch input, the stylus input being executed by a user controlling a stylus and the touch input being executed by the user using a body part of the user, processing the stylus input as a manipulation input corresponding to the virtual screen when the touch screen input is the stylus input, and moving the screen view on the virtual screen in response to a touch movement of the touch input when the touch screen input is the touch input.

In accordance with an aspect of the present invention, an apparatus for controlling a virtual screen is provided. The apparatus includes a touch screen display unit configured to display a screen view that displays a partial area of the virtual screen and to detect a touch screen input on the screen view, and a controller configured to determine whether the touch screen input is a stylus input, which is executed by a user controlling a stylus, or a touch input, which is executed by the user using a body part of the user, to process the stylus input as a manipulation input corresponding to the virtual screen when the touch screen input is the stylus input, and to control to move the screen view on the virtual screen in response to a touch movement of the touch input when the touch screen input is the touch input.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and configurations may be omitted for clarity and conciseness.

The terms and words used in the following description and the appended claims are not limited to bibliographical meanings, but are merely used herein to enable a clear and consistent understanding of the present invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, exemplary embodiments of the present invention will be described. For example, the exemplary embodiments may be described in a case where a mobile terminal is a touch screen device. However, the present invention is not limited thereto, and the exemplary embodiments may also be applied to other apparatuses having a similar technical features, operations and uses. Further, the exemplary embodiments of the present invention may be applied to other apparatuses through some modifications by those having ordinary skill in the art, to which the present invention pertains, without departing from the spirit and scope of the present invention. Namely, the exemplary embodiments of the present invention may be applied to an apparatus even when the apparatus is a touch screen device but is not a mobile terminal. For example, the exemplary embodiments of the present invention may be applied to a Personal Digital Assistant (PDA), a tablet computer, a laptop computer, or any other similar and/or suitable electronic device having a touch screen device.

Figure 1:
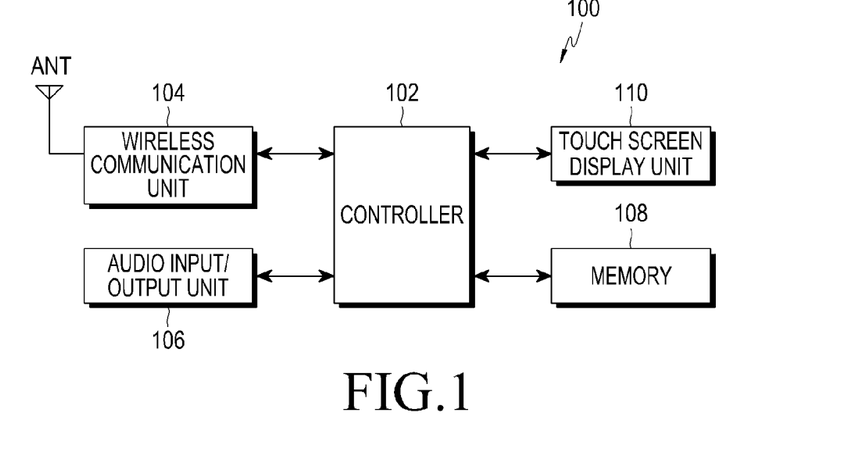
FIG. 1 is a block diagram showing a configuration of a mobile terminal according to an exemplary embodiment of the present invention.

FIG. 1 is a block diagram showing a configuration of a mobile terminal for controlling a virtual screen according to an exemplary embodiment of the present invention.

Referring to FIG. 1, a mobile terminal 100 may be a smart phone. The mobile terminal 100 may include a controller 102, a wireless communication unit 104, an audio input/output unit 106, a memory 108, and a touch screen display unit 110. With respect to a description of the mobile terminal 100, a configuration, features, and/or elements which are not needed for a description of a control of a virtual screen according to an exemplary embodiment of the present invention will be omitted if possible.

Referring to FIG. 1, according to a control of the controller 102, the wireless communication unit 104 may transmit and receive wireless signals for a mobile communication service of the mobile terminal 100. The audio input/output unit 106 may include an audio output device (not shown), such as a speaker, and an audio input device (not shown), such as a microphone, and may input and output various audio signals according to the operation of the controller 102. The memory 108 may store a program for the operation of the controller 102, and may store various data according to the execution of the controller 102. The memory 108 may further include an external memory (not shown), and may further include a storage unit (not shown), such as a Hard Disk Drive (HDD) or any other similar and/or suitable storage unit for storing information and/or data. The touch screen display unit 110 may provide an input interface and an output interface between the mobile terminal 100 and a user.

The touch screen display unit 110 may include a touch screen (not shown). The touch screen display unit 110 may display a screen image on the touch screen according to the operation of the controller 102, and provides a touch screen input on the touch screen to the controller 102. The touch screen display unit 110 may display a screen view according to the execution of an application, which provides a virtual screen, by the controller 102, and the touch screen display unit 110 may detect a touch screen input that may be inputted on the screen view and may provide the detected touch screen input, and/or information corresponding to the detected touch screen input, to the controller 102.

The mobile terminal 100 may further include an input device (not shown), for example, a keypad or buttons, other than the touch screen display unit 110. The mobile terminal 100 may further include a communication means (not shown), for example, a wired and wireless communication means, such as a Universal Serial Bus (USB), a Local Area Network (LAN), Bluetooth, and any other similar and/or suitable communication means other than the wireless communication unit 104.

The controller 102 may control the wireless communication unit 104, the audio input/output unit 106, the memory 108 and the touch screen display unit 110, and may performs functions and overall operations of the mobile terminal 100. When the application providing the virtual screen is executed, the controller 102 may control the touch screen display unit 110 so as to display a screen view according to the execution of an application, and may control a virtual screen according to a touch screen input that may be inputted through the screen view. The controller 102 may be included in, and/or implemented by a main controller (not shown) of the mobile terminal 100 in order to additionally execute the functions and/or operations of controlling a virtual screen according to an exemplary embodiment of the present invention. Furthermore, the controller 102 may be implemented as a dedicated processor or controller for executing only the functions and/or operations of controlling a virtual screen, or the controller 102 may be implemented in dedicated hardware. However, the present invention is not limited thereto, and the controller 102 may be implemented by any suitable and/or similar hardware element.

When the touch screen display unit 110 detects a touch screen input on the screen view, the controller 102 may determine a type of the touch screen input. Namely, the controller 102 may determine whether the touch screen input is a stylus input or a touch input. In order to distinguish between a stylus input and a touch input, the controller 102 may, for example, distinguish between them according to a difference in size between an area where a stylus touches a touch screen, such as the touch screen display unit 110, and an area where a human body touches the touch screen. As another example, the controller 102 may distinguish between a stylus input and a touch input by using a panel (not shown) for detecting the stylus input that is separate from another panel (not shown) for detecting the touch input. As described above, there are various known technologies, devices, elements and methods, each of which may determine whether a touch screen input is a stylus input or a touch input. Accordingly, any suitable elements, hardware and operations a further description of them will be omitted.

The controller 102 may control a virtual screen, which may be different for each determined type of the touch screen input. In other words, when a result of the determination shows that the touch screen input on the screen view is the stylus input, then the controller 102 may determine the touch screen input to be a manipulation input related to a virtual screen, and the controller 102 may process the touch screen input and control the virtual screen according to the manipulation input. The manipulation input related to the virtual screen may be used to perform operations such as selecting, editing, or any other similar and/or suitable operations that may be performed on the virtual screen. Also, when a result of the determination shows that the touch screen input on the screen view is the touch input, then the controller 102 may determine the touch screen input to be an input related to the movement of the screen view, and may processes the touch screen input accordingly.

Figure 2:
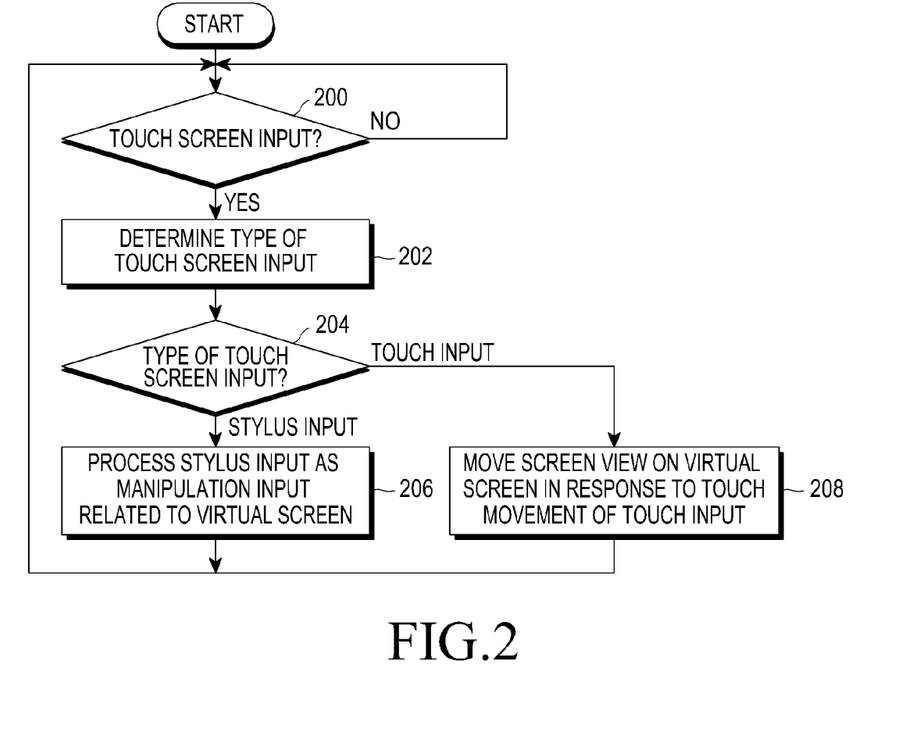
FIG. 2 is a flowchart showing a control of a virtual screen according to an exemplary embodiment of the present invention.
Figure 3A:
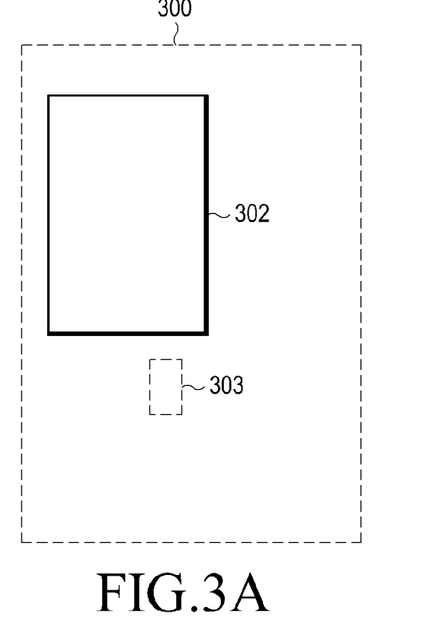
FIGS. 3A to 3C illustrate an example of editing using a screen view according to an exemplary embodiment of the present invention.
Figure 3B:
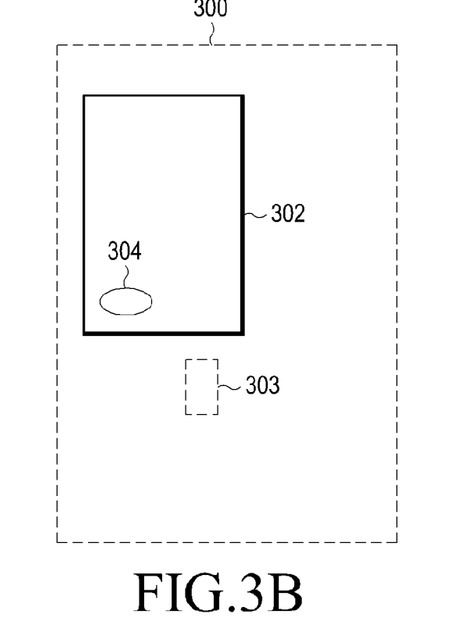
Figure 3C:
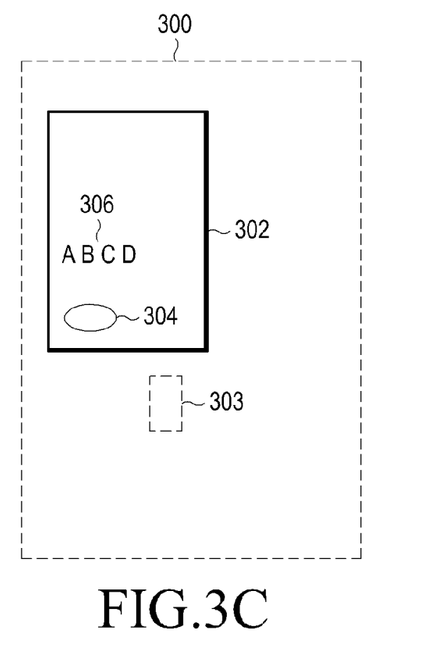

FIG. 2 is a flowchart showing a control of a virtual screen according to an exemplary embodiment of the present invention, and FIGS. 3A to 3C illustrate an example of editing using a screen view according to an exemplary embodiment of the present invention.

Referring to FIG. 2 and FIGS. 3A to 3C, control of a virtual screen may be executed by the controller 102 while the controller 102 controls the touch screen display unit 110 so as to display a screen view according to the execution of an application which provides the virtual screen. In step 200, the controller 102 may identify whether a touch screen input is detected. When the touch screen input is detected, the controller 102 may then determine a type of the detected touch screen input in step 202. According to the determined type of the touch screen input, the controller 102 may then proceed from step 204 to at least one of step 206 or step 208.

When the touch screen input is a stylus input, the controller 102 may proceed to step 206, and when the touch screen input is a touch input, the controller 102 may proceed to step 208. The controller 102, in step 206, processes the stylus input as a manipulation input related to a virtual screen, and may then return to step 200. An example of processing the stylus input as the manipulation input related to the virtual screen will be described hereinafter with reference to FIGS. 3A to 3C.

As shown in FIGS. 3A to 3C, a virtual screen 300, and a screen view 302 are shown. An area 303 of the virtual screen 300 is not displayed on the screen view 302, whereas an area of the virtual screen which is displayed is the screen view 302. While a partial area of the virtual screen 300 is being displayed on the screen view 302, as shown in FIG. 3A, a user may edit, for example, an image on the virtual screen as shown in FIG. 3B or FIG. 3C. FIG. 3B shows an example where the user draws an oval 304 on the screen view 302 by using a stylus, and FIG. 3C shows an example where the user writes letters 306 on the screen view 302 by using the stylus. The controller 102 may edit an image on the virtual screen 300 according to stylus input.

The controller 102 may first move the screen view 302 on the virtual screen 300 in response to a touch movement of the touch input in step 208, and may then return to step 200. In step 208, the controller 102 may move the screen view 302 on the virtual screen 300 at a speed and in a direction respectively corresponding to a speed and a direction of the touch movement of the touch input. Specifically, the controller 102 may move the screen view 302 at a speed equal to or proportional to the speed of the touch movement of the touch input. Also, the controller 102 may move the screen view 302 in a direction corresponding to the direction of the touch movement of the touch input. Otherwise, depending on an application which provides a virtual screen, the controller 102 may move the screen view 302 in a direction opposite to the direction of the touch movement of the touch input.

The term "touch movement" may be a gesture wherein a part of a human body, such as a finger, moves from one point to another point while the part of the human body is kept in contact with a touch screen. For example, the touch movement may include gestures such as a dragging, a flick, a multi-touch drag, a scroll, or any other similar and/or suitable touch screen gestures. A dragging movement and/or gesture may be a gesture by which the user, after touching a finger of the user to a touch point on the touch screen, moves the finger from the touch point at a speed lower than a set speed while the user keeps touching the touch screen, and then releases the touch after moving the finger from the touch point. Also, a flick gesture may be a gesture by which the user first moves a touch point at a speed equal to or higher than the set speed and then releases the touch.

Figure 4:
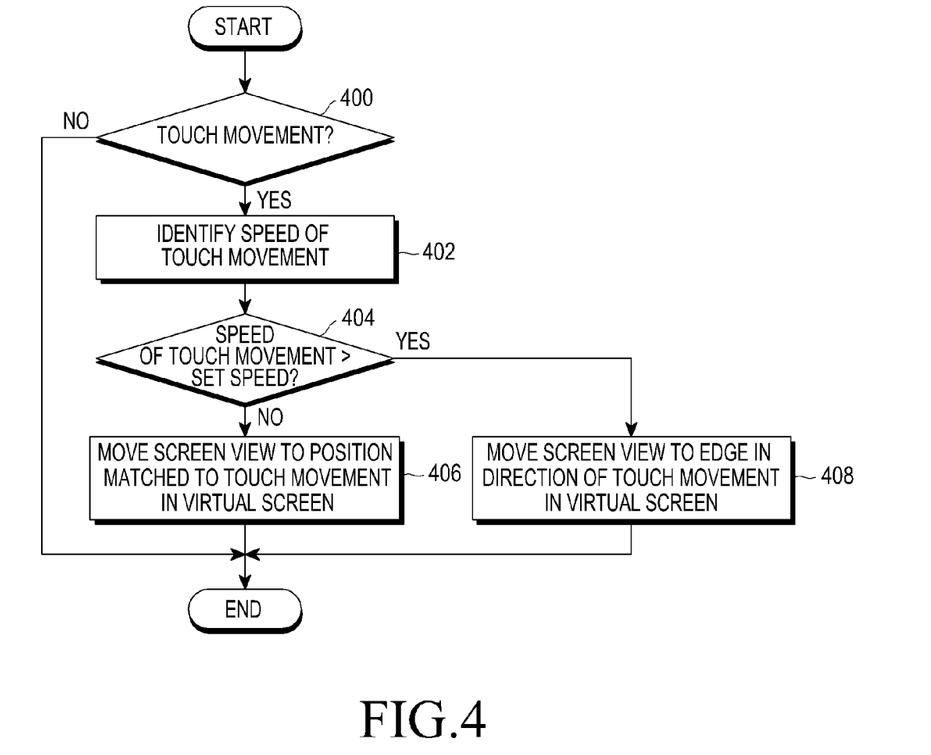
FIG. 4 is a flowchart showing a control of a movement of a screen view according to an exemplary embodiment of the present invention.

FIG. 4 is a flowchart showing a control of a movement of a screen view according to an exemplary embodiment of the present invention, and FIGS. 5A to 5D illustrate examples of a movement of a screen view according to an exemplary embodiment of the present invention.

Referring to FIG. 4 and FIGS. 5A to 5D, an exemplary embodiment of step 208 as shown in FIG. 2, is shown in further detail. In step 400, the controller 102 may identify whether the touch input is a touch movement. When the touch input is a touch movement, such as a dragging or a flick, then the controller 102 performs step 402 in order to identify a speed of the touch movement. When the touch input is not the touch movement but rather, a tap or other similar gestures, the controller 102 may complete the processing of the operations shown in FIG. 4. Furthermore, the tap may be a gesture by which the user does not move a touch of his/her finger on a touch screen after touching it to the touch screen and then releases the touch within a predetermined time period without having moved the touch screen.

Next, after the controller 102 identifies a speed of the touch movement in step 402, the controller 102, in step 404, may then determine whether the speed of the touch movement is greater than a set speed, such as a threshold speed and/or a predetermined speed. The set speed may be a speed which is set for a touch movement, for example, a speed which is set in order to distinguish between a dragging and a flick according to the speed of the touch movement. Accordingly, when the touch movement is, for example, the dragging, the speed of the touch movement may be less than the set speed. Furthermore, when the touch movement is, for example, the flick, the speed of the touch movement may be greater than the set speed.

When a result of the determination in step 404 shows that the speed of the touch movement is less than the set speed, then the controller 102 may proceed to step 406. In step 406, the controller 102 may move the screen view to a position corresponding to the touch movement in the virtual screen. An example of the movement of the screen view in step 406 will be described hereinafter with reference to FIGS. 5A and 5B. Furthermore, when the result of the determination in step 404 shows that the speed of the touch movement is greater than the set speed, then the controller 102 may proceed to step 408. In step 408, the controller 102 may move the screen view to the edge of the virtual screen in a direction corresponding to the direction of the touch movement on the virtual screen. An example of the movement of the screen view in step 408 will be described hereinafter with reference to FIGS. 5C and 5D.

Figure 5A:
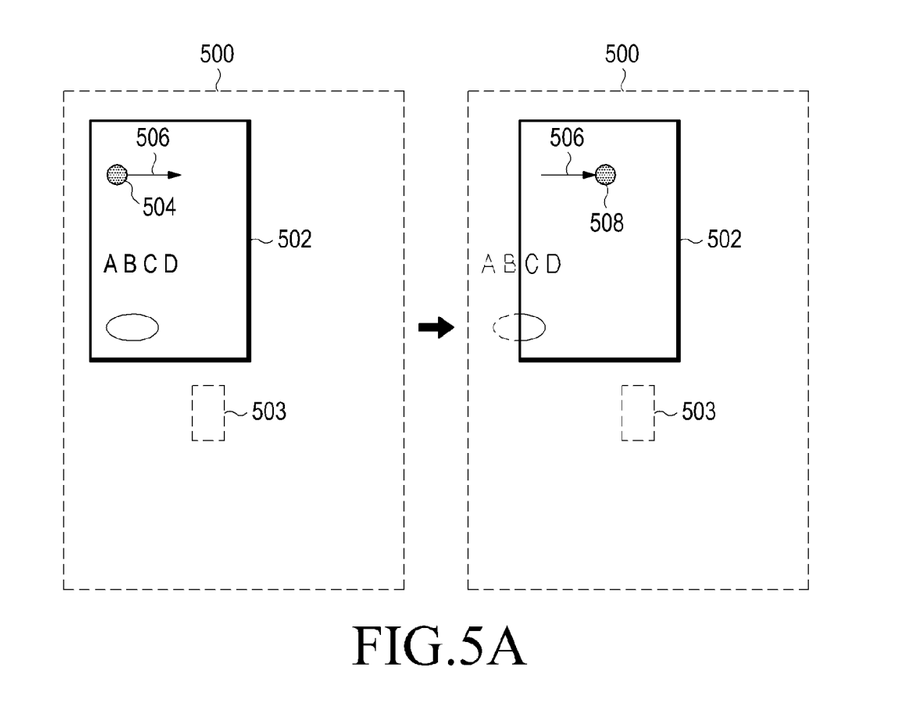
FIGS. 5A to 5D illustrate examples of a movement of a screen view according to an exemplary embodiment of the present invention.
Figure 5B:
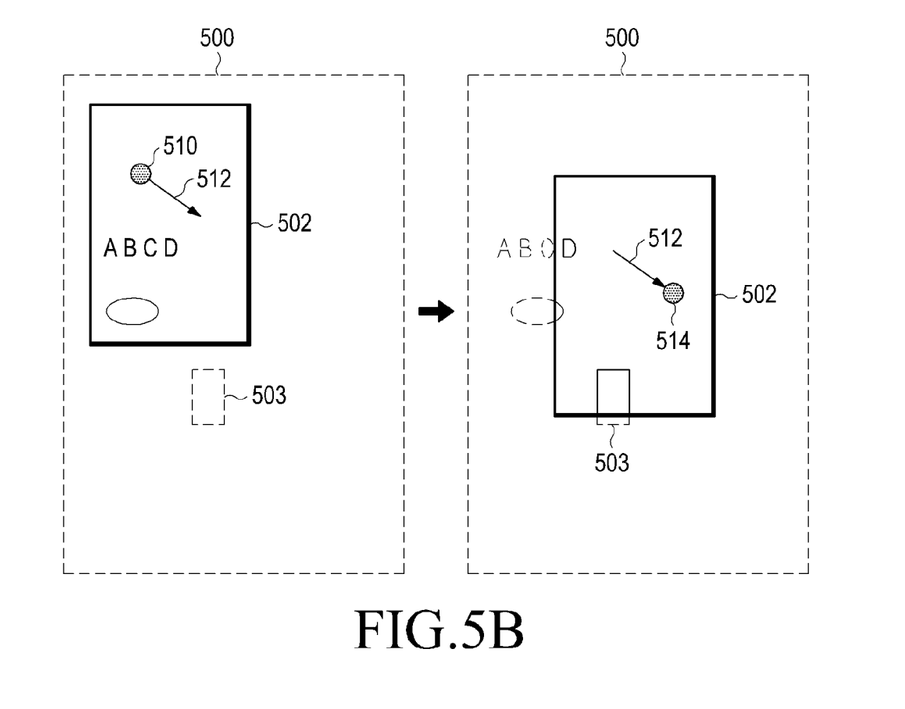
Figure 5C:
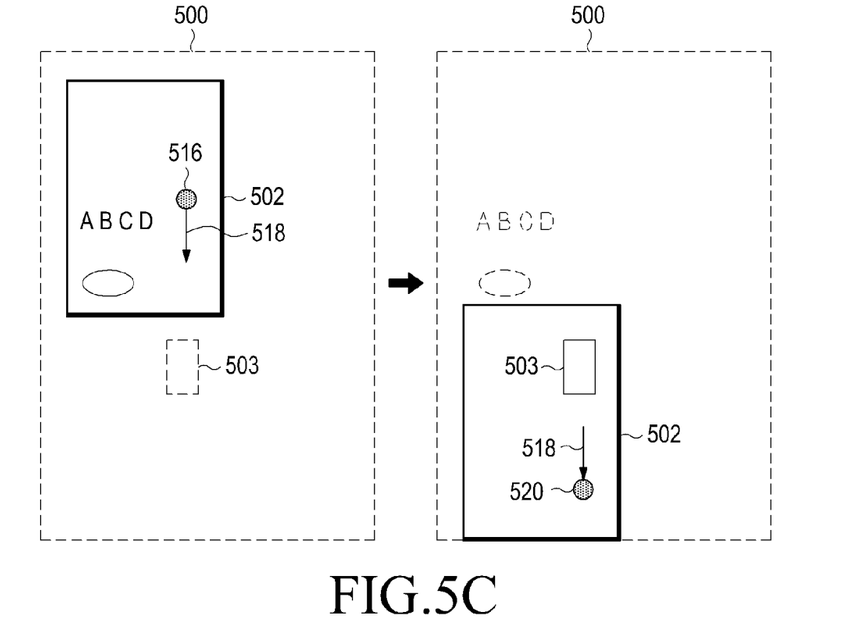
Figure 5D:
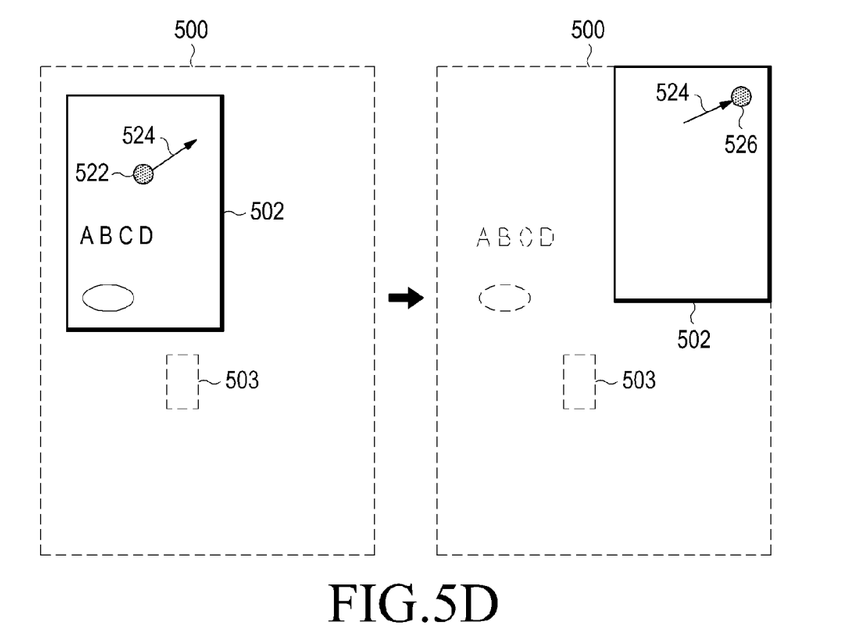

Referring to FIGS. 5A to 5D, FIGS. 5A and 5B show an example of the movement of a screen view 502 in step 406, and FIGS. 5C and 5D show an example of the movement of the screen view 502 in step 408. In FIGS. 5A to 5D, a virtual screen 500 and the screen view 502 are shown. Furthermore, in FIGS. 5A to 5D, an area 503, as well as other text, graphics and images of the virtual screen 500 which are not displayed on the screen view 502 are shown in a dotted line, and an area of the virtual screen 500 and the other text, graphics and images which are displayed on the screen view 502, are shown in a solid line.

Referring to FIG. 5A, when a touch movement 506, having a speed less than a set speed, occurs from a start point 504 of the touch movement 506 to an end point 508 of the touch movement 506, in a direction that is approximately horizontal to and to the right of the start point 504, as shown in FIG. 5A, then the screen view 502 may move in a direction and to a position corresponding the end point 508, according to the touch movement 506 on the virtual screen 500. Referring to FIG. 5B, when a touch movement 512, having a speed less than the set speed, occurs from a start point 510 of the touch movement 512 to an end point 514 of the touch movement 512, in a direction that is approximately diagonal to and to the right of the start point 510, as shown in FIG. 5B, then the screen view 502 may move in a direction and to a position corresponding to the end point 514, according to the touch movement 512 on the virtual screen 500.

When the screen view 502 moves as shown in FIGS. 5A and 5B, a movement speed of the screen view 502 may be approximately equal to a movement speed of each of the touch movements 506 and 512. However, the present invention is not limited thereto, and a movement speed of the screen view 502 may be proportional to and/or correspond to a movement speed of each of the touch movements 506 and 512 in any suitable manner. Similarly, a movement distance of the screen view 502 may be approximately equal to a movement distance of each of the touch movements 506 and 512, or may be proportional to and/or correspond to a movement distance of each of the touch movements 506 and 512 in any suitable manner.

Also, according to an application which provides the virtual screen 500, a movement direction of the screen view 502 may be opposite to the movement direction as shown in each of FIGS. 5A and 5B. Namely, the movement direction of the screen view 502 may be opposite to the movement direction of each of the touch movements 506 and 512. In other words, according to an exemplary embodiment of the present invention, the touch movements 506 and 512 may correspond to a moving of the screen view 502 while the virtual screen 500 remains in a fixed position with respect to the screen view 502, or the touch movements 506 and 512 may correspond to a moving of the virtual screen 500 while the screen view 502 remains in a fixed position with respect to the virtual screen 500.

Referring to FIG. 5C, when a touch movement 518, having a speed greater than a set speed, from a start point 516 of the touch movement 518 to an end point 520 of the touch movement 518, in a direction that is approximately vertical to and below the start point 516, as shown in FIG. 5C, then the screen view 502 may move to an edge of the virtual screen 500 according to the touch movement 518 on the virtual screen 500. Referring to FIG. 5D, when a touch movement 524, from a start point 522 of the touch movement 524 to an end point 526 of the touch movement 524, occurs in a direction that is approximately diagonal to the start point 522, as shown in FIG. 5D, then the screen view 502 may move to the edge of the virtual screen 500 according to the touch movement 524 on the virtual screen 500.

When the screen view 502 moves as shown in FIGS. 5C and 5D, a movement speed of the screen view 502 may be approximately equal to a movement speed of each of the touch movements 518 and 524. However, the present invention is not limited thereto, and a movement speed of the screen view 502 may be proportional to and/or correspond to a movement speed of each of the touch movements 518 and 524 in any suitable manner. Furthermore, according to an exemplary embodiment, a movement distance of the screen view 502 may be irrelevant to a movement distance of each of the touch movements 518 and 524. Namely, as shown in FIGS. 5C and 5D, the screen view 502 may move to the edge of the virtual screen 500 regardless of the movement distance of each of the touch movements 518 and 524. However, the present invention is not limited thereto, and the movement distance of the screen view 502 may correspond to the respective movement distances of each of the touch movements 518 and 524 in any suitable manner.

With respect to the exemplary embodiments of FIGS. 5A to 5D, the touch movements 506, 512, 518, and 524, and corresponding movements of the screen view 502, are described as having specific directions. However, the present invention is not limited to those directions, and the touch movements 506, 512, 518, and 524, and corresponding movements of the screen view 502 may be in any suitable and/or similar direction. As described above, according to the exemplary embodiments of the present invention, a determination may be made as to whether a touch screen input on a screen view is a stylus input or a touch input. Then, the stylus input may be used only as a manipulation input corresponding to a virtual screen having a part that is displayed by the screen view, and the touch input may be used for the movement of the screen view to change the part of the virtual screen that is displayed by the screen view.

As described above, processing according to the stylus input may not overlap with processing according to the touch input. Accordingly, it is possible to implement control of a manipulation input that corresponds to the virtual screen and that is executed on the screen view and to implement control of a movement of the screen view according to the manipulation input. Therefore, a User Interface (UI) and/or User Experience (UX) scenario allowing for screen view manipulation may be implemented, and a response speed of both the manipulation input related to the virtual screen and the movement of the screen view may be improved. Also, the user may perform manipulations and/or operations such as selecting, viewing, editing, and/or any other similar and/or suitable manipulations and/or operations that are related to the virtual screen by using the stylus, and may move the screen view by using the finger of the user, so that the user may use the virtual screen intuitively and naturally. Accordingly, an explanation of a method for using a virtual screen may not need to be provided to the user, or may be simply explained to the user.

Figure 6:
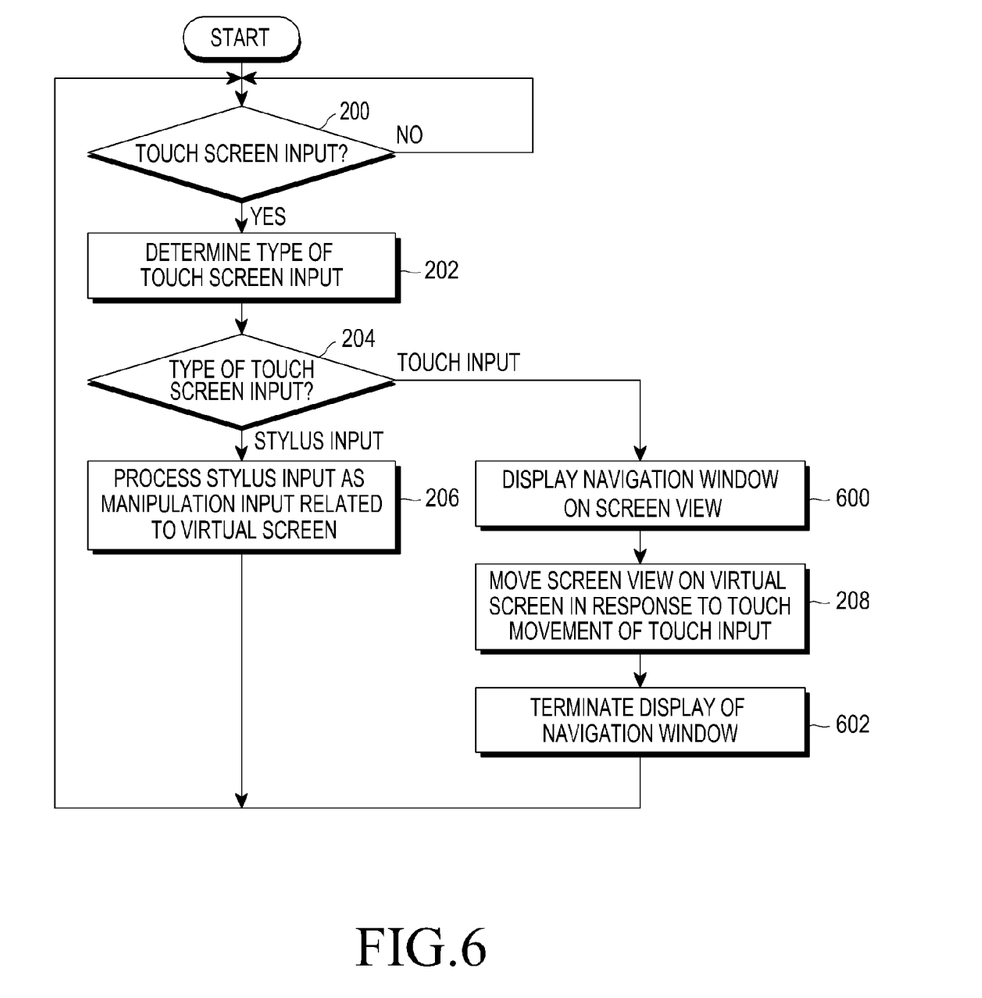
FIG. 6 is a flowchart showing a control of a movement of a screen view according to another embodiment of the present invention.

FIG. 6 is a flowchart showing a control of a movement of a screen view according to another exemplary embodiment of the present invention.

Referring to FIGS. 2 and 6, steps 200 to 208, as shown in FIG. 6, are respectively identical to steps 200 to 208 as shown in FIG. 2, which are described above. However, as compared with FIG. 2, step 600 is added before step 208, and step 602 is added after step 208. Therefore, hereinafter, a description of steps 200 to 208 will be omitted.

Referring to FIG. 6, when a type of the touch screen input is determined, in step 204, to be a touch input, then the controller 102 may activate and display a navigation window on the screen view in step 600, and may then performs step 208. The navigation window may include a screen displaying navigation information of the screen view in the virtual screen. Next, after moving the screen view in step 208, the controller 102, in step 602, may terminate the display of the navigation window by deactivating the navigation window, and may then return to step 200. Accordingly, while the touch input is detected by the controller 102, the navigation window may be continuously displayed.

Figure 7:
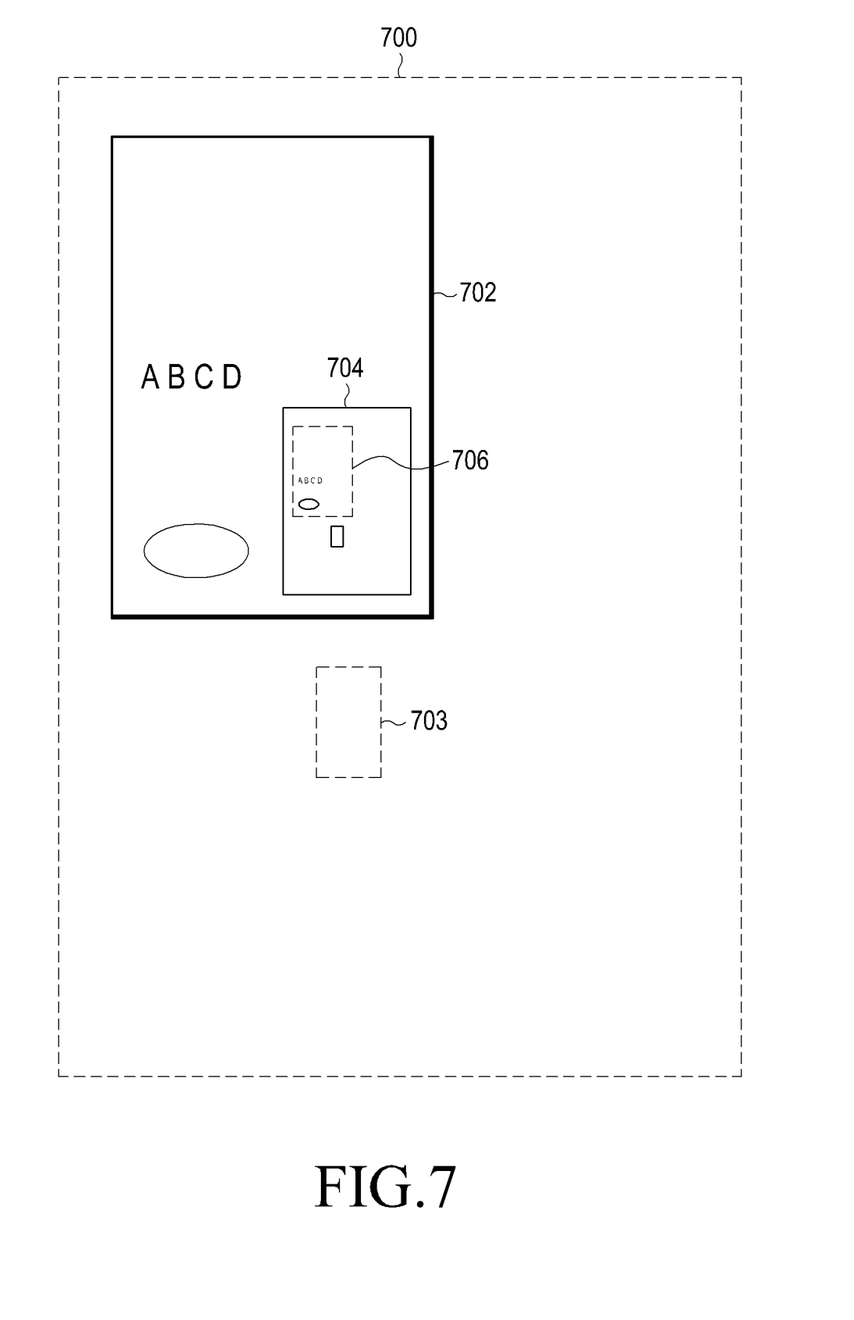
FIG. 7 illustrates an example of a screen view according to another embodiment of the present invention.

FIG. 7 illustrates an example of a screen view according to another exemplary embodiment of the present invention.

Referring to FIG. 7, the display of a navigation window 704, as described with respect to step 600 of FIG. 6, is shown. In FIG. 7, a virtual screen 700 and a screen view 702 are shown. An area 703 of the virtual screen 700, which is not displayed on the screen view 702, is shown in a dotted line, and an area of the virtual screen 700 that is displayed as the screen view 702 is shown in a solid line. The navigation window 704 may be displayed on the screen view 702 and may display a reduced image of the virtual screen 700. Also, the navigation window 704 may include a marker 706 indicating a position of the screen view 702 on the virtual screen 700. Accordingly, when the user moves the screen view 702, the user may more easily understand movement conditions by using the navigation window 704, and may more easily move the screen view 704 to a desired position on the virtual screen 700.

In a case where a method for controlling a virtual screen according to exemplary embodiments of the present invention is applied to a mobile device, the mobile device may be used to control the virtual screen in such a manner that the mobile device may first download, from a remotely-located apparatus, such as a server, for providing a program, and/or install the program, which may be an application or any other similar and/or suitable program, for controlling the virtual screen, and may then execute the program. Namely, when the program for controlling the virtual screen is installed on the mobile device, the program may be executed on the mobile device, and may provide control of the virtual screen. The apparatus for providing the program for controlling the virtual screen may transmit the program to the mobile device in response to a request for transmitting the program, which has been made by the mobile device, or may automatically transmit the program to the mobile device. However, the present invention is not limited thereto, and the program for controlling the virtual screen may be installed on the mobile device by a manufacturer or may be pre-installed on the mobile device in any suitable manner.

Additionally, the apparatus for providing the program may perform a determination as to whether the mobile device is to subscribe to a service, may perform a user authentication, may perform an identification of payment information, and may perform any other similar and/or suitable function corresponding to downloading, installing, and executing the program for controlling the virtual screen on the mobile device. The apparatus for providing the program may include a communication unit for performing wired or wireless communication with the mobile device, a storage medium for storing the program, and a control unit for controlling the communication unit so as to transmit the program to the mobile device, and any other similar and/or suitable programs, data and elements for providing the program to the mobile device. The storage medium may be located inside or outside the apparatus for providing the program.

The exemplary embodiments of the present invention may be implemented in the form of hardware or a combination of hardware and software. Such software may be stored in a non-transitory computer readable storage medium, such as a volatile or non-volatile storage device such as a Read-Only Memory (ROM) and a Random Access Memory (RAM), a Compact Disc (CD), a Digital Versatile Disc (DVD), a magnetic disk, a magnetic tape which is optically or magnetically recordable and readable by a machine, or any other similar and/or suitable non-transitory computer readable storage medium. Accordingly, the present invention may include a program including a code for implementing an apparatus or a method claimed in any claim of this specification, and a non-transitory computer readable storage medium in which this program may be stored and which is readable by a machine, such as a computer. Also, the program may be electronically conveyed via any medium such as a communication signal transmitted through a wired or wireless connection, and the present invention suitably includes equivalents of this program.

While the invention has been shown and described with reference to certain exemplary embodiments thereof, it will be understood by those skilled in the art that various changes in form and details may be made there in without departing from the spirit and scope of the invention as defined by the appended claims and their equivalents.

What is claimed is:

1. A method for controlling a virtual screen displayed on an electronic device, the method comprising:
   detecting a touch screen input on a screen view, the screen view displaying a partial area of the virtual screen on a display of the electronic device, the virtual screen comprising a viewing area that corresponds to the partial area displayed on the screen view and a non-viewing area that is not displayed on the screen view;
   determining whether the touch screen input comprises a stylus input or a touch input, the stylus input being executed using a stylus and the touch input being executed using a finger of the user;
   when it is determined that the touch screen input comprises the touch input, displaying a navigation window displaying navigation information corresponding to the screen view in the virtual screen in a partial region of the screen view; and
   processing the touch screen input according to the determining, wherein the processing comprises:
      processing the stylus input as a data input corresponding to the virtual screen, in response to determining that the touch screen input corresponds to the stylus input, and
      moving the screen view to view a different area of the virtual screen in response to a touch movement of the touch input, in response to determining that the touch screen input corresponds to the finger touch input.

2. The method as claimed in claim 1, wherein the moving of the screen view comprises moving the screen view at a speed corresponding to a speed of the touch movement of the touch input.

3. The method as claimed in claim 2, wherein the moving of the screen view comprises moving the screen view to an edge of the virtual screen corresponding to a direction of the touch movement of the touch input on the virtual screen when the touch movement of the touch input is performed at a speed greater than or equal to a predetermined speed and when the touch input is released.

4. The method as claimed in claim 1, wherein the displaying of the navigation window comprises:
   activating the navigation window when the touch input is detected; and
   deactivating the navigation window when the touch input is at least one of not detected or terminated.

5. The method as claimed in claim 1, wherein the moving of the screen view comprises moving the screen view in a direction corresponding to a direction of the touch movement of the touch input.

6. The method as claimed in claim 5, wherein the direction corresponding to the direction of the touch movement is opposite to the direction of the touch movement.

7. An apparatus for controlling a virtual screen, the apparatus comprising:
   a touch screen display configured to detect a touch screen input on a screen view displayed by the touch screen display; and
   at least one processor configured to:
      control the touch screen display to display the screen view, which displays a partial area of the virtual screen, the virtual screen comprising a viewing area that corresponds to the partial area displayed on the screen view and a non-viewing area that is not displayed on the screen view,
      determine whether the touch screen input comprises a stylus input, which is executed using a stylus, or a touch input, which is executed using a finger of the user,
      when it is determined that the touch screen input comprises the touch input, display a navigation window displaying navigation information corresponding to the screen view in the virtual screen in a partial region of the screen view, and
      process the touch screen input according to the determining, wherein the processing of the touch screen input comprises:
         processing the stylus input as a data input corresponding to the virtual screen, in response to determining that the touch screen input corresponds to the stylus input, and
         moving the screen view to view a different area of the virtual screen in response to a touch movement of the touch input, in response to determining that the touch screen input corresponds to the finger touch input.

8. The apparatus as claimed in claim 7, wherein the at least one processor is further configured to move the screen view at a speed corresponding to a speed of the touch movement of the touch input.

9. The apparatus as claimed in claim 8, wherein the at least one processor is further configured to move the screen view to an edge of the virtual screen corresponding to a direction of the touch movement of the touch input on the virtual screen when the touch movement of the touch input is performed at a speed greater than or equal to a predetermined speed and when the touch input is released.

10. The apparatus as claimed in claim 7, wherein the at least one processor is further configured to:
    activate the navigation window when the touch input is detected, and
    deactivate the navigation window when the touch input is at least one of not detected or terminated.

11. The apparatus as claimed in claim 7, wherein the at least one processor is further configured to move the screen view in a direction corresponding to a direction of the touch movement of the touch input.

12. The apparatus as claimed in claim 11, wherein the direction corresponding to the direction of the touch movement is opposite to the direction of the touch movement.

* * * * *